(12) United States Patent
Hagano et al.

(10) Patent No.: US 6,202,882 B1
(45) Date of Patent: Mar. 20, 2001

(54) STRUCTURE OF FUEL POURING INLET

(75) Inventors: Hiroyuki Hagano, Inazawa; Masayuki Nakagawa, Iwakura, both of (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/444,722

(22) Filed: Nov. 24, 1999

(30) Foreign Application Priority Data

Nov. 24, 1998 (JP) .................................................. 10-333160

(51) Int. Cl.$^7$ ...................................................... B65D 41/06
(52) U.S. Cl. .................. 220/295; 220/86.2; 220/203.06; 220/212.5; 220/301; 220/DIG. 33
(58) Field of Search ............................... 220/86.2, 203.24, 220/298, 303, 304, 301, DIG. 33, 295, 212.5

(56) References Cited

U.S. PATENT DOCUMENTS

| | | | |
|---|---|---|---|
| 4,020,970 | * 5/1977 | Koscik et al. | 220/302 |
| 4,497,419 | * 2/1985 | Reitzel | 220/302 |
| 5,524,786 | * 6/1996 | Skudlarek | 220/86.2 |
| 5,529,201 | * 6/1996 | Tallent et al. | 220/86.2 |
| 5,615,793 | * 4/1997 | Muller | 220/86.2 |
| 5,924,590 | * 7/1999 | Jocie et al. | 220/298 |

* cited by examiner

Primary Examiner—Joseph M. Moy
(74) Attorney, Agent, or Firm—Pillsbury Madison & Sutro LLP

(57) ABSTRACT

An elastic arm part is provided on an outer periphery of a cylinder part of a cap, and a projection is formed in an outer periphery of an opening part. When the cap is loosened, the arm part engages the projection and is elastically deformed and after releasing the engagement of the arm part and the projection, an engagement between a first screw part and a second screw part is released. Even if an engaging distance between a first screw part and a second screw part is short, the cap is prevented from rapidly opening, and it is possible to lengthen a time a fuel steam is slowly discharged from the opening part.

6 Claims, 8 Drawing Sheets

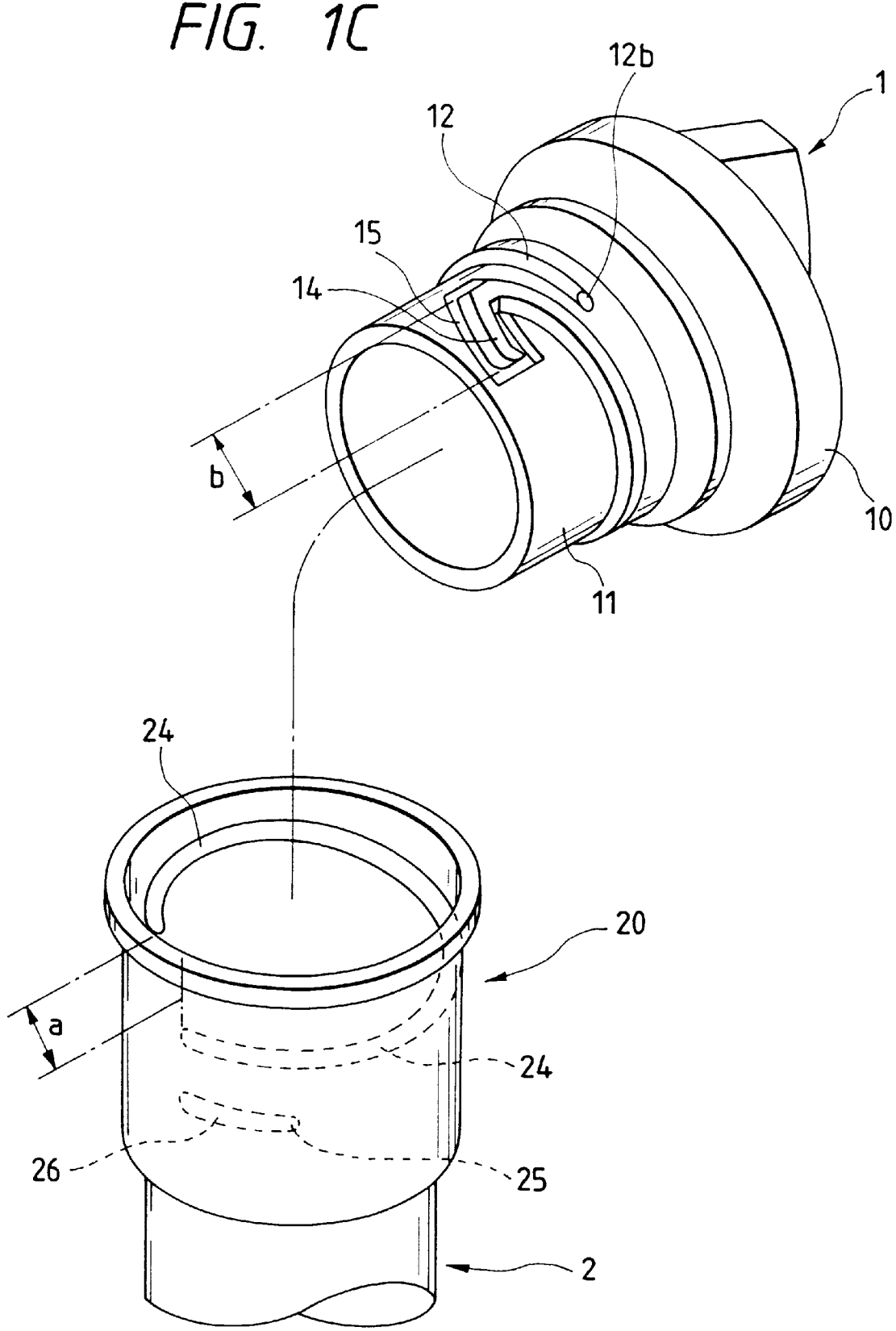

STRUCTURE OF FUEL POURING INLET

BACKGROUND OF THE INVENTION

1. Field of the Invention

The present invention relates to an engaging structure of a fuel cap and a filler neck pipe for a fuel pouring inlet of automobile.

The present application is based on Japanese Patent Application No. Hei. 10-333160, which is incorporated herein by reference.

2. Description of the Related Art

A filler neck pipe extending from a fuel tank has an opening toward the fuel pouring inlet of automobile, and the opening is screwed in engagement with the fuel cap. In short, a first screw threaded in an outer periphery of the fuel cap and a second screw threaded in an inner periphery of the filler neck pipe are engaged, so that a sealing part of a fuel cap is fast to the opening of the filler neck-pipe so as to close the opening of the filler neck pipe and prevent a fuel steam from volatilization. The filler cap is,when pouring the fuel, taken off from the filler neck pipe by rotating the fuel cap, e.g., in a counterclockwise direction, and if, after pouring the fuel, the fuel cap is put on the opening of the filler neck pipe and is rotated, e.g., in a clockwise direction, the opening of the filler neck pipe is closed.

When fastening the fuel cap onto the opening of the filler neck pipe, the fastening should go on until the sealing portion of the fuel cap is fast to the opening of the filler neck pipe and is exactly sealed.

Fuel caps housing therein torque detecting mechanism and sound mechanism have recently been known. In the fuel cap having the torque detecting mechanism, when rotating the fuel cap until a necessary tightening amount that the sealing part of the fuel cap is closely attached to the opening of the filler neck pipe, the torque detecting mechanism works to cause the fuel cap to run idle and cause the sound mechanism to issue a sound to notify with a sound that the fuel cap is tightened up to the necessary tightening amount. An operator can recognize thereby that the fuel cap is exactly tightened, and a dullness or loosening of the sealing portion by over-tightening can be prevented.

Since pressure of the fuel steam in a fuel tank is increased at high temperature time in midsummer, the fuel steam or the fuel may be spouted at once from the opening of the filler neck pipe at the same time when the fuel cap is removed. So, in conventional structures of the fuel pouring inlet, an engaging distance between the first screw part in the fuel cap and the second screw part in the opening of the filler neck pipe is lengthened to make difficult rapid opening of the cap so that the fuel steam slowly discharged from a space between both until taking off the fuel cap so as to prevent abrupt spouting of the fuel steam.

Incidentally, if the engaging distance between the first screw part of the fuel cap and a second screw part in the opening of the filler neck pipe is lengthened, such a problem will arise that a person easily misunderstands that the screwing is finished before the torque detecting mechanism works. In this case, the sealing property of the cap is insufficient to allow the fuel steam to run away in an atmospheric air.

On the other hand, if the engaging distance between the first screw part and the second screw part is shortened, it is easy to open and close the cap, but the inconveniences as mentioned above are easy to occur.

SUMMARY OF THE INVENTION

The invention is to solve such an exclusive event, and it is an object of the invention that one step or a plurality of steps are introduced before releasing the engagement between the first screw part of the fuel cap and the second screw part of the opening part of the filler neck pipe, so that, though the engaging distance of the first screw part and the second screw part is shortened, slowly discharging time of the fuel steam may be lengthened, thereby to securely avoid abruptly spouting of the fuel steam or rapidly opening of the fuel cap.

The structure of the fuel pouring inlet according to the first aspect of the invention is achieved by furnishing a first engaging part having elasticity and elastically deforming in circumferential direction or diameter direction in one sides of an outer periphery of the cylinder part and an inner periphery of the opening, and a second engaging part engageable with the first engaging part in another sides of the outer periphery of the cylinder part and the inner periphery of the opening. When mounting the cap, the first engaging part is engaged with the second engaging part and is elastically deformed, and after releasing the engagement of the first engaging part and the second engaging part, the first screw part and the second screw part is screwed whereby the cap is fitted and secured on the filler neck pipe. When removing the cap, the first engaging part is engaged with the second engaging part and is elastically deformed, and after releasing the engagement of the first engaging part and the second engaging part, the engagement between the cap and the filler neck pipe is released.

In the structure of the fuel pouring inlet according to the present invention, the first engaging part can be constituted by an arm part having elasticity defined in the outer periphery of the cylinder part, and the second engaging part can be constituted by a projection defined in the inner periphery of the opening part.

In the structure of the fuel pouring inlet according to the present invention, the first engaging part can be substantially V-shaped, projecting from the outer periphery of the cylinder part and elastically deformable, following the outer periphery, in directions that one end of the first engaging part is near to and remote from another end, and the second engaging part can be constituted by a notch for allowing the engaging part defined in the second screw part to pass under a condition of being elastically deformed.

The structure of the fuel pouring inlet according to the present invention, the first engaging part can be constituted by a convex part elastically deformable as rising and setting in a diameter direction from the outer periphery of the cylinder part, and the second engaging part can be constituted by the second screw in itself, and the convex part passes the second screw part under a condition that it is set from the cylinder part, and the first screw part is composed which is engageable with the second screw part under a condition that the convex part projects from the cylinder part.

Features and advantages of the invention will be evident from the following detailed description of the preferred embodiments described in conjunction with the attached drawings.

BRIEF DESCRIPTION OF THE DRAWINGS

In the accompanying drawings:

FIG. 1C shows a perspective view showing a state where a cap is removed from a filler neck pipe;

DETAILED DESCRIPTION OF THE PREFERRED EMBODIMENTS

Figure 1A:
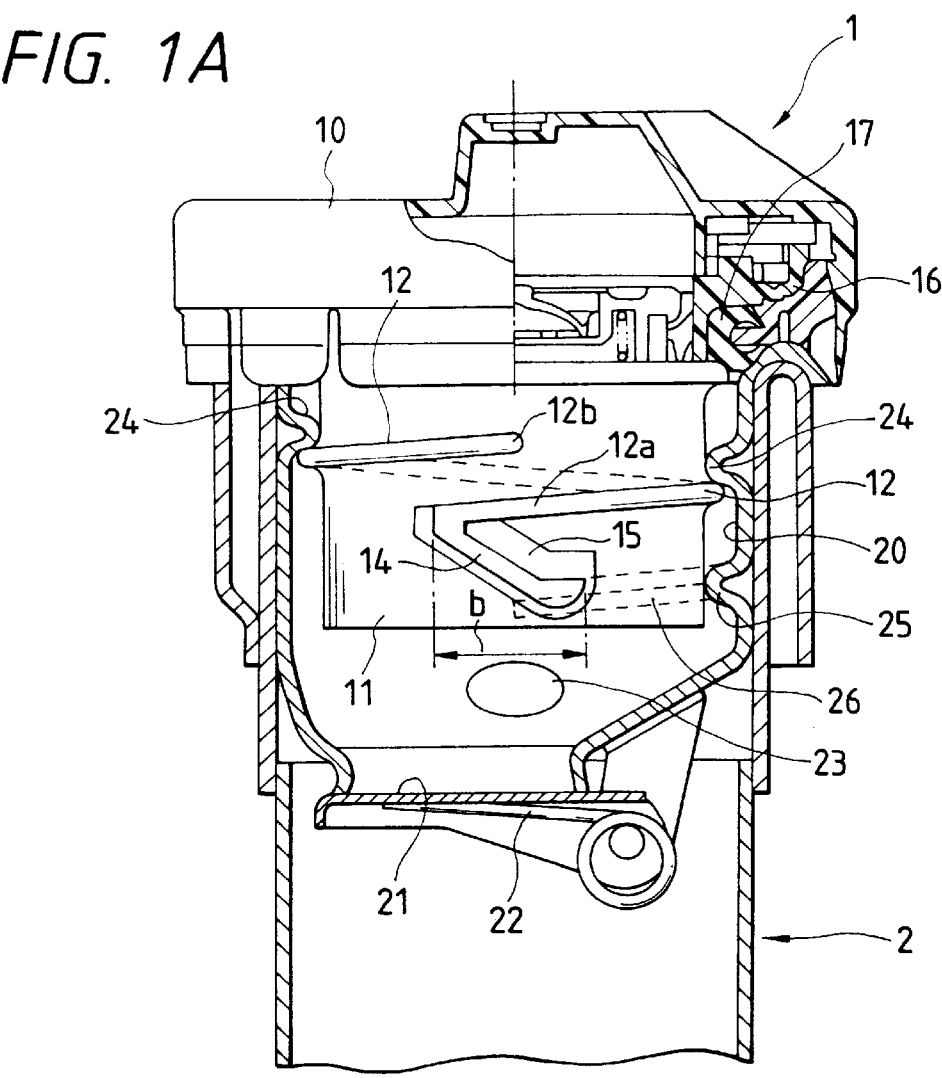
FIG. 1A shows a cross sectional view of the structure of the fuel pouring inlet according to a first embodiment of the invention.

In the structure of the fuel pouring inlet described in the first invention, when attaching the cap onto the filler neck pipe, at first the cylinder part is inserted in the opening part, and a screw starting end part of the first screw part is engaged with a screw end part of the second screw part. For example, in case that the first engaging part and the second engaging part are formed respectively from the screw starting end to a screw terminal end, by rotating the cap, e.g., clockwise, the cylinder part advances in the opening part by the screwing of the first screw part and the second screw part.

At this time, when the first engaging part and the second engaging part are engaged, an operator feels resistance by the elastic deformation of the first engaging part and recognizes the screwing. When the screwing is further advanced, the engagement between the first engaging part and the second engaging part is released, and the operator feels no resistance. If the structure is designed such that the screwing is ended at this point, he ends the fastening. If the structure is designed such that the screwing is ended after this point, he will end after further rotation of the cap.

In case that the structure is designed such that the screwing is accomplished at a time when the engagement between the first engaging part and the second engagement is released, the elasticity of the first engaging part can be functioned as a conventional torque detecting mechanism does. But in this case, if the sealing part of the cap is dull or deteriorated, the sealing property of the filler neck pipe is often lowered by the cap. Therefore, it is preferable that the structure is designed such that the screwing is ended after further screwing than the time when the engagement between the first engaging part and the second engaging part is released. In a latter case, it is desirous that the same torque detecting mechanism and the sound mechanism as the related art are provided so as to prevent the sealing portion from being made dull by over tightening.

When the cap is removed from the filler neck pipe for a supplying an oil, if rotating the cap, e.g., counterclockwise, the cylinder part is retreated to the opening side in the opening part by the screwing between the first screw part and the second screw part. The sealing property of the sealing part is released thereby, so that the fuel seam is gradually discharged. By more loosening the cap, the first engaging part and the second engaging part are engaged.

The pressure of the fuel steam in the filler neck pipe acts on the pipe in a direction discharging from the opening part. On the other hand, the structure is composed such that the elastic force of the first engaging part acts in the circumferential direction or the diameter direction of the cylinder part. Therefore, even if the pressure of the fuel steam in the filler neck pipe is high, the engagement between the first engaging part and the second engaging part is not released by such pressure, rather the cap is prevented from rapidly opening by the engagement between the first engaging part and the second engaging part.

After engaging the first engaging part and the second engaging part, the operator feels resistance by the elastic deformation of the second engaging part and recognizes the screwing will be released soon. Further, if the cap is more loosened, he feels no resistance by releasing the engagement between the first engaging part and the second engaging part. If the structure is designed such that the engagement between the cap and the filler neck pipe is released at this time, the operator takes off the cap and ends the work. If the structure is designed such that the cap is further loosened than this time point and taken off, he will further rotate the cap to take it off.

According to the structure of the fuel pouring inlet as described in the first invention, even if the engaging distance between the the first screw part and the second screw part is short, the cap is prevented from rapidly opening by the engagement between the first engaging part and the second engaging part. Also under a condition that the first engaging part and the second engaging part are engaged, the fuel steam can be easily discharged from the opening part. If the engaging distance between the first screw part and the second screw part is shortened, a time that the fuel steam is slowly released from the opening part can be shortened and such disadvantage can be avoided that the fuel steam is spouted on taking off the cap.

According to the structure of the fuel pouring inlet as described in the second invention, the first engaging part is an arm part having elasticity defined in the outer periphery of the cylinder part, and the second engaging part is a projection defined in the inner periphery of the opening part. The engagement between the arm part and the projection avoids the cap from rapidly opening part. Also under a condition that the arm part and the projection are engaged, the fuel steam can be easily discharged, and the disadvantage that the fuel steam is spouted from the opening part on taking off the cap can be avoided.

According to the structure of the fuel pouring inlet as described in the third invention, the first engaging part is substantially V-shaped, projecting from the outer periphery of the cylinder part and elastically deformable, following the outer periphery, in directions that one end of the first engaging part is near to and remote from another end, and the second engaging part is a notch for allowing the engaging part defined in the second screw part to pass under a condition of being elastically deformed. Thus, the engagement between the engaging part and the notch prevents the cap from rapidly opening part. Also under a condition that the engaging part and the notch are engaged, the fuel steam can be easily discharged, so that the time that the fuel steam is slowly released from the opening part can be lengthened, and the disadvantage that the fuel steam is spouted on taking off the cap can be avoided.

In the case of the structure of the fuel pouring inlet as described in the third invention, when removing the cap, the cap is rotated until the engaging part is engaged with the notch, and is further rotated so that the engaging part is elastically deformed to allow the notch to pass, and the cap is pulled thereafter. Namely, two step actions of rotation and pull are necessary, so that the time that the fuel stem is released in the atmospheric air can be more lengthened, and the disadvantage that the fuel steam is spouted on taking off the cap can be avoided.

According to the structure of the fuel pouring inlet as described in the fourth invention, the first engaging part is a convex part elastically deformable as rising and setting in a diameter direction from the outer periphery of the cylinder part, and the second engaging part is composed of the second screw in itself, and the convex part passes the second screw part under a condition that it is set from the cylinder part, and the first screw part is composed which is engageable with the second screw part under a condition that the convex part projects from the cylinder part.

When the cap is attached onto the filler neck pipe, at first the cylinder is inserted into the opening part, and then the convex part is pressed by the second screw part and elastically deformed as it is set in the cylinder part, so that the convex gets over the second screw part, and at the same time it is elastically deformed due to reaction force and projected from the cylinder. Thus the convex functions as the first screw part and screws the second engaging part.

For removing the cap, when the cap is rotated, it is retreated in the opening direction of the filler neck pipe by screwing the convex part and the second screw part, and finally when the cap is pulled in the direction remote from the opening part, the convex part is elastically deformed and is released from the engagement with the second screw part, and the cap can be removed. Thus, the engagement between the convex part and the second screw part prevents the cap from rapidly opening part. Also under a condition that the convex part and the second screw part are engaged, the fuel steam can be easily discharged, so that the time that the fuel steam is slowly released from the opening part can be lengthened, and the disadvantage that the fuel steam is spouted on taking off the cap can be avoided.

According to the invention, the engagement between the first engaging part and the second engaging part prevents the cap from rapidly opening part, and the time that the fuel steam is slowly released from the opening part can be lengthened. Therefore, the engaging distance between the first screw part and the second screw part is shorter than a convention one, for example, being within 360 degree is desirable. Thereby, while keeping safety, the rotation of the cap can be made easy.

When the first engaging part is the arm part, it is preferable that the arm part is formed to extend from the screw starting end of the first screw part and the projection is placed corresponding to a position of the arm part at such a time. The resistance is recognized thereby immediately before finishing the screwing, so that the operating feeling is heightened. The arm part is easily formed. A slant continuing to the projection is preferably formed. In such a way, the resistance may be gradually increased when engaging the arm part and the projection, and the operating feeling is naturally sensed.

The elastically deforming direction of the arm part may be selected from the circumferential or radius directions of the cylinder part. Depending upon situations, the elastic deformation may be provided in both of the circumferential and radius directions.

When the first engaging part is formed to be a substantially V-shaped engaging part, it is preferable that the engaging part is formed in the vicinity of the screw starting end of the first screw part, and the notch is provided between the screw starting and finishing ends of the second screw part. The resistance is recognized thereby immediately before finishing the screwing, so that the operating feeling is heightened. The elastic force of the engaging part can be functioned as the related art torque detecting mechanism.

When the first engaging part is a convex part elastically deformable as rising and setting in a diameter direction from the outer periphery of the cylinder part, it is preferable that the second screw part is to be a double-screw thread, and the cylinder part is preferably formed with a positioning projection for engaging the end of the double-screw thread. In such a manner, the positioning projection is engaged with the end of the second screw part, so that the structure is composed as the convex part is held at a position engaging the screw starting end of the second screw part, and a positioning performance at attaching the cap is improved. In addition, if the positioning projection is, at pulling, engaged with the end part of the second screw part, a drawing timing may be perceived. The convex part may be directly elastically deformable in itself, or may be made indirectly elastically deformable by providing a biasing member to effect the convex part in a projecting direction from the cylinder.

The invention will be practically explained, referring to the embodiments.

1st Embodiment

FIG. 1A shows a cross sectional view of the structure of the fuel pouring inlet according to a first embodiment of the present invention. FIG. 1C shows a perspective view showing a state where a cap 1 is removed from a filler neck pipe 2. This structure of the fuel pouring inlet is applied to a structure of a fuel pouring inlet for a gasoline tank of automobile.

The structure of the fuel pouring inlet comprises the cap 1 and the filler neck pipe 2, and the cap 1 comprises a cylindrical cover part 10 having a bottom and a cylinder part 11 extending via a torque detecting mechanism 16 from the cover part 10. The cover part 10 is disposed with a ring shaped gasket 17, and is provided therein with the torque detecting mechanism 16 and a sound mechanism (not shown).

On an outer circumferential surface of the cylinder part 11, the first screw part 12 of a single screw thread projects outside in a radius direction, and a distance between a screw starting end part 12a of the first screw part 12 and a screw terminal end part 12b falls in a range of around 360 degree of the outer circumference of the cylinder part 11. At the screw starting end part 12a of the first screw part 12, an arm part 14 extending to a front end side of the cylinder 11 and bending around 30 degree is formed turnably following the outer circumferential surface of the cylinder part 11. On the outer circumferential surface of the cylinder part 11 around the arm part 14, a concave part 15 is provided in order to form the arm part 14 to be separated from the outer circumferential surface of the cylinder part 11 and allow elastic deformation of the arm part 14 if the cap 1 is molded by injection molding. It is not always necessary to provide the concave part 15 if the arm part 14 is separated from the outer circumferential surface of the cylinder part 11. In this embodiment, the first screw part 12 and the arm part 14 are injection-molded of polyamide integrally with the cylinder part 11. A bore can be formed instead of the concave part 15.

A filler neck pipe 2 has a metal-made cylindrical opening part 20 at the front end, and when the gasket 17 is attached under pressure to the circumference at the front end of the opening part 20, the opening 29 is air-tightly closed by the cap 1. Further, at the outer circumferential surface of the opening part 20, a lid 21 is turnably held and is biased by a spring 22 to close a rear end opening of the opening part 20. The opening part 20 is formed with three vent holes 23.

On the inner circumferential surface of the opening part 20, the second screw part 24 of the single screw thread is formed projecting inward in the radius direction. A screwing distance of the second screw part 24 falls in a range of 360 degree in an inner circumference of the opening part 20. A projection 25 is formed under the screw terminal end part 12b of the second screw part 24, and a projecting thread part 26 is formed continuing from the projection 25, the projecting thread part 26 becoming lower in height as separating from the projection 25 on extension of the second screw part 24.

Figure 1B:
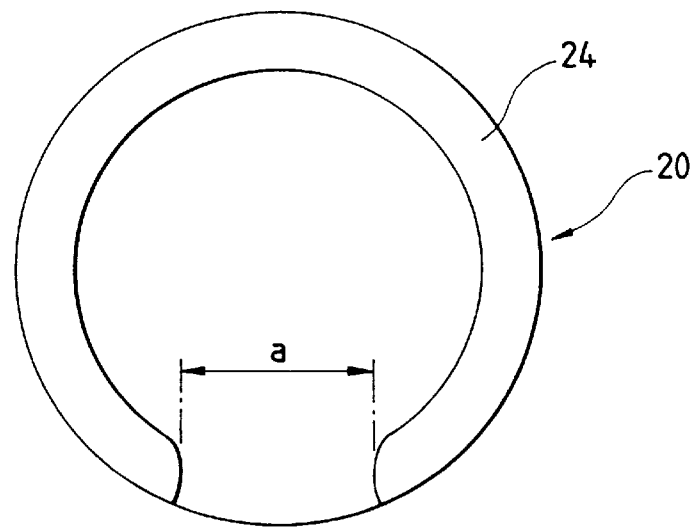
FIG. 1B shows a plan view of an opening part in view from the upper side.

In the structure of the fuel pouring inlet of the instant embodiment, when the cap 1 is tightened on the filler neck pipe 2, the cylinder part 11 is at first inserted in the opening part 20. Hereupon, a notch is formed in the second screw part 24 as shown in FIG. 1B, and the horizontal distance (a) of the notch is slightly larger than the horizontal length (b) of the arm part 14. Accordingly, the arm part 14 passes through the notch of the second screw part 24, and the first screw part 12 contacts the second screw part 24. Then, the cap 1 is turned clockwise so the first screw part 12 engages the second screw part 24, and the screwing starts. When the cap 1 is rotated around 360 degree, the front end of the arm 15 gets over the projection 25 just before finishing of the screwing, and if the screwing goes ahead further, the gasket 17 is attached under pressure to the circumference of the front end of the opening part 20 and the screwing is finished. FIG. 1 shows the screw finished position. Namely, with respect to the cylinder part 11, the screwing is accomplished at the position where the front end of the arm part 14 further rotates until the position shown in FIG. 1 from an apex of the projection 25. Incidentally, the aforementioned relationship of (a) and (b) is same as modifications shown in FIGS. 2 to 4.

At the screw accomplished position shown in FIG. 1, the torque detecting mechanism 16 works, and the cylinder part 11 does not rotate but the cover part 10 only rotates clockwise, and the sound mechanism (not shown) issues a sound for the operator to recognize it, so that the gasket 17 may be prevented from dullness caused by over tightening.

When taking off the cap 1 from the filler neck pipe 2, the cover part 10 is rotated counterclockwise, and the cylinder part 11 is also rotated in synchronization. The moment of rotation, compression of the gasket 17 is released, the fuel steam slowly discharged in the atmospheric air from a space formed between the cap 1 and the filler neck pipe 2.

Immediately after starting the rotation of the cylinder part 11, the front end of the arm part 14 contacts the projection 26, and while the arm part 14 is gradually elastically deforming in an upper right direction of FIG. 1, it gets to the position of the projection 25. Accordingly, the resistance by the elastic force of the arm part 14 gradually increases, and also in this duration the fuel steam is released in the atmospheric air.

The front end of the arm part 14 gets over the projection 25, so that the resistance from the arm part 14 is released, and thereafter the cap 1 can be lightly rotated. If the screw starting end part 12a of the first screw part 12 is separated from the screw starting end part of the second screw part 24, the cap 1 can be removed from the filler neck part 2.

Thus, according to the structure of the fuel pouring inlet of the present embodiment, due to the resistance effected by the elastic deformation of the arm part 14, it is difficult to rapidly rotate the cap 1, and a time while the arm part 14 is caused to be elastically deformed is inevitably lengthened. Since the fuel steam is discharged bit by bit in the air in this duration and the pressure of the fuel steam is lowered, at a time when the front end of the arm part 14 gets over the projection 25, the pressure of the fuel steam is almost an atmospheric pressure. Accordingly, it is possible to shorten the screw distance from the time when the front end of the arm part 14 gets over the projection 25 at removing the cap 1, exhibiting the operational excellency. Even if the engagement between the first screw part 12 and the second screw part 24 is released, there is no disadvantage that the fuel steam is spouted at once.

The resistance by the elastic deformation of the arm part 14 is, when tightening the cap 1, heightened only the moment when the front end of the arm part 14 gets over the projection 25. When taking off the cap 1, the resistance is slowly heightened immediately after rotating it counterclockwise, and the resistance suddenly fades away when the front end of the arm 14 gets over the projection 25, and thereafter no resistance is perceived. Therefore, the structure is excellent in the operating feeling.

Figure 2:
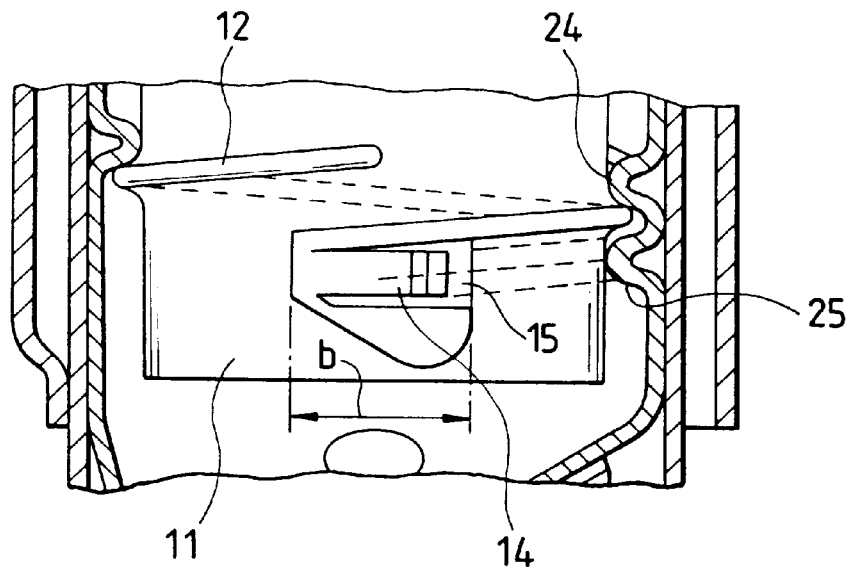
FIG. 2 shows an elementary cross sectional view of modification of the structure of the fuel pouring inlet according to the first embodiment of the invention.
Figure 3:
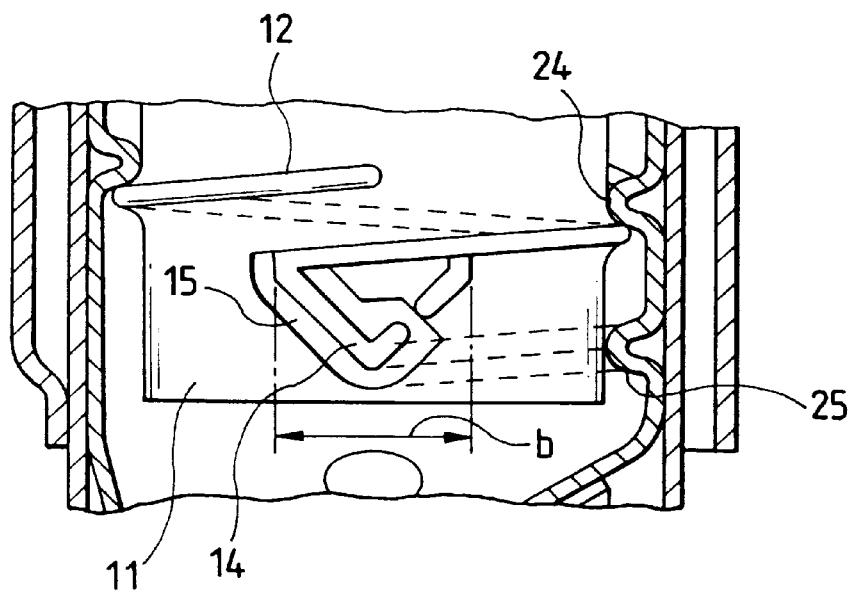
FIG. 3 shows an elementary cross sectional view of modification of the structure of the fuel pouring inlet according to the first embodiment of the invention.
Figure 4:
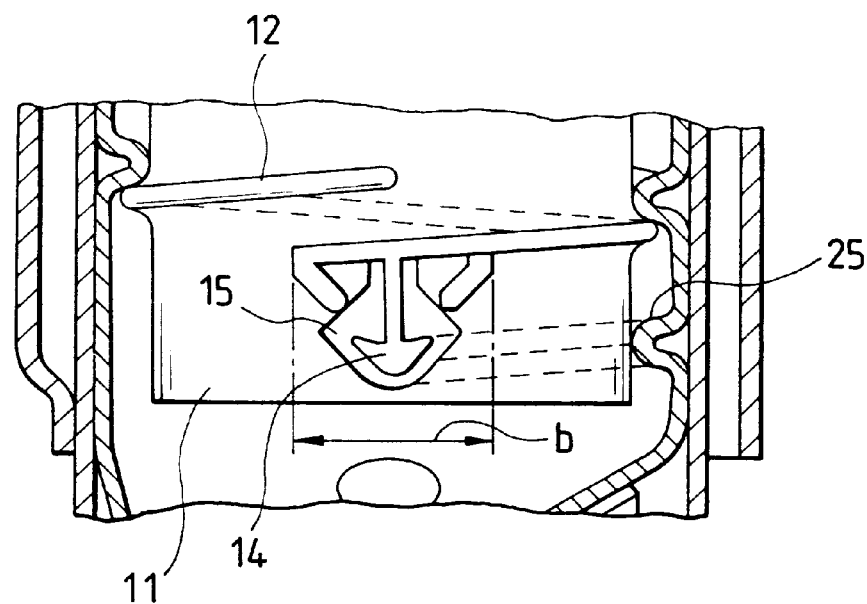
FIG. 4 shows an elementary cross sectional view of modification of the structure of the fuel pouring inlet according to the first embodiment of the invention.
Figure 5:
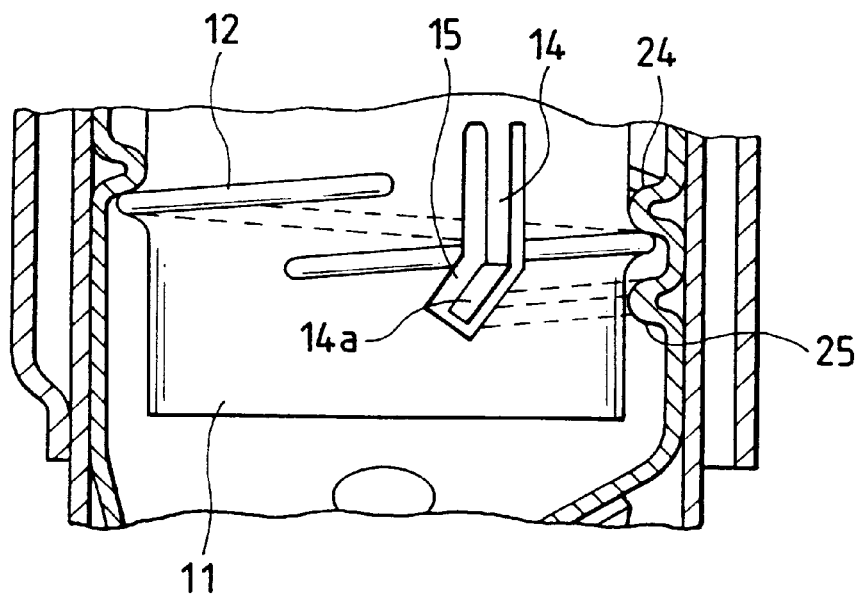
FIG. 5 shows an elementary cross sectional view of modification of the structure of the fuel pouring inlet according to the first embodiment of the invention.

FIGS. 2 to 5 illustrate modified examples of the embodiment 1. A structure of a fuel pouring inlet shown in FIG. 2 is that the arm part 14 is elastically deformable in the radius direction of the cylinder part 11 and is defined with a bore 15 for allowing deformation of the arm part 14. A structure of a fuel pouring inlet shown in FIG. 3 is that the arm part 14 is elastically deformable in the circumferential direction of the cylinder part 11 and is defined with a concave part 15 (a bore being allowed) for allowing deformation of the arm part 14. Also a structure of a fuel pouring inlet shown in FIG. 4 is that the arm part 14 is elastically deformable in the circumferential direction of the cylinder 11 and is defined with a concave part 15 (a bore being allowed) for allowing deformation of the arm part 14. In a structure of a fuel pouring inlet shown in FIG. 5, the arm part 14 extends almost in an axial direction of the cylinder part 11, extending from the upper part of the cylinder part 11 across the first screw part 12. This arm part 14 is elastically deformable in the radius direction of the cylinder part 11, and is defined with a bore 15 for allowing deformation of the arm part 14. A protrusion 14a being projected in the radius direction of the cylinder part 11 is formed at the tip end of the arm part 14. The protrusion 14a contacts the projection 25.

As illustrated, the elastic deforming directions may variously selected, and the arm 14 may also be variously shaped.

2nd Embodiment

Figure 6:
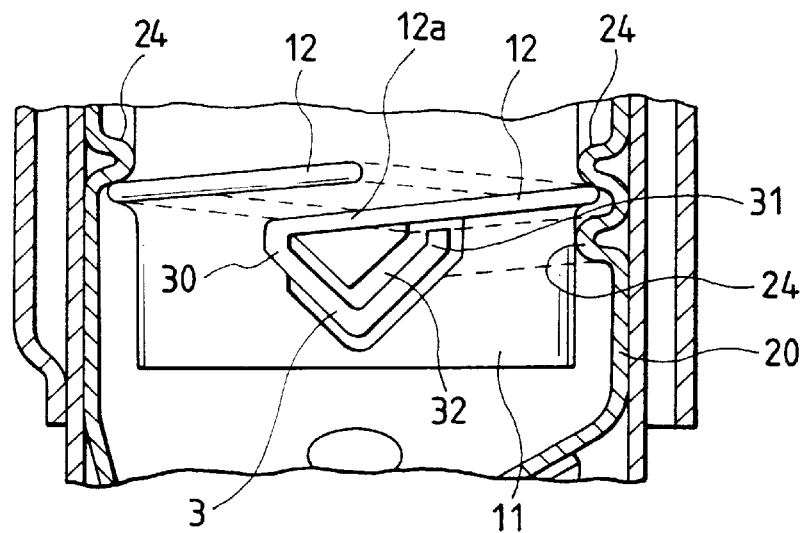
FIG. 6 shows an elementary cross sectional view of the structure of the fuel pouring inlet according to a second embodiment of the invention.

FIG. 6 illustrates the structure of the fuel pouring inlet according to a second embodiment of the present invention.

This structure of the fuel pouring inlet is the same as the first embodiment excepting different structure to be described in the following.

The cylinder part 11 has a first screw part 12 of a double screw thread, and an elastically deformable engaging part 3 of a substantially V-shape is formed in the screw starting end 12a of the first screw part 12. One end 30 of the engaging part 3 is a one body with the first screw part 12 and is elastically deformable in directions that the other end 31 is near to and remote from the one end 30.

Figure 7:
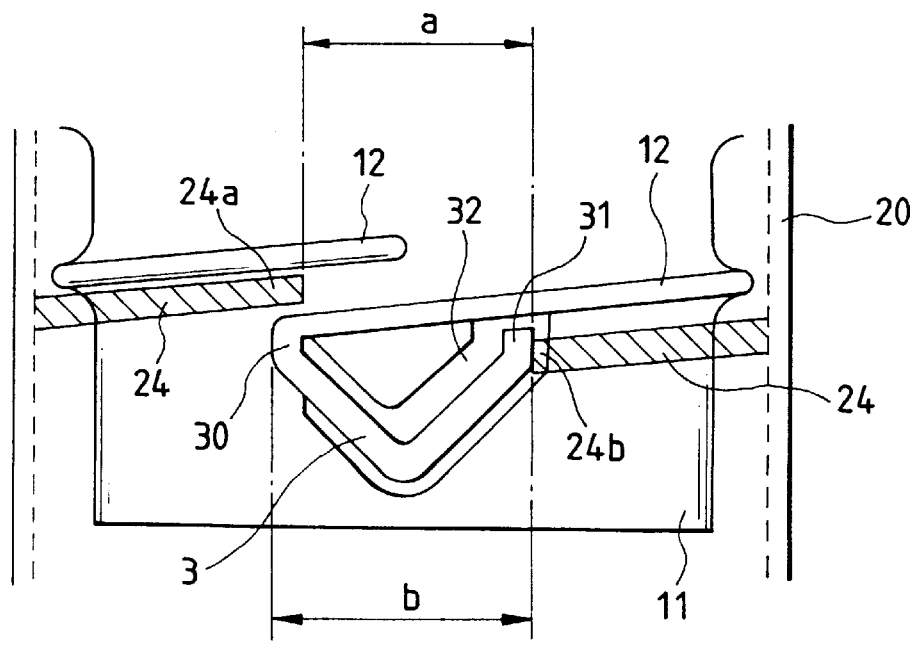
FIG. 7 shows an elementary cross sectional view showing working of the structure of the fuel pouring inlet according the second embodiment of the invention.
Figure 8:
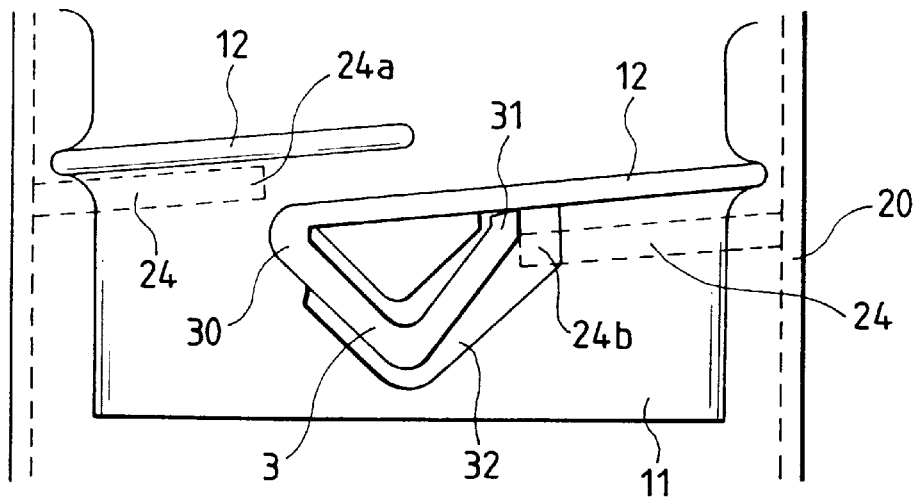
FIG. 8 shows an elementary cross sectional view showing working of the structure of the fuel pouring inlet according to the second embodiment of the invention.

The opening part 20 has the second screw part 24 of a double screw thread, and between the screw starting end 24a of the second screw part 24 and the screw terminal end 24b, as shown in FIGS. 7 and 8, a notch of a horizontal distance (a) is formed.

The engaging part 3 is substantially V-shaped, and is allowed for elastic deformation following the outer circumferential surface of the cylinder part 11 by the concave part 32 formed in the periphery. A horizontal distance (b) between the end 30 and the other end 31 is slightly larger than the horizontal distance (a) of the notch under a condition where no force is effected on the engaging part 3.

In the structure of the fuel pouring inlet of the instant embodiment, when the cap 1 is tightened on the filler neck pipe 2, the cylinder part 11 is at first inserted in the opening part 20 and the cap 1 is turned clockwise. Then, the front end of the engaging part 3 engages the notch of the horizontal distance (a) formed between the screw starting end 24a of the second screw part 24 and the screw terminal end 24b, and under this condition, the cap 1 is pressed in the axial direction. Thereby, the engaging part 3 is pressed by the notch to cause the elastic deformation as shown in FIG. 8, and if further pressing, a condition shown in FIG. 7 is generated. The first screw part 12 engages the second screw part 24 so as to start the screwing. If the cap 1 is rotated clockwise around 45 degree, the screwing is finished. At this screw finished position, the torque detecting mechanism 16 is worked, and the cylinder part 11 is not rotated but the cover part 10 only is rotated clockwise. The sound mechanism (not shown) issues a voice, and the operator recognizes it, thereby enabling to prevent the gasket 17 from being made dull.

When taking off the cap 1 from the filler neck pipe 2, the cover part 10 is rotated counterclockwise, and the cylinder part 11 is also rotated in synchronization. The moment of rotation, compression of the gasket 17 is released, the fuel steam is slowly discharged in the atmospheric air from the space formed between the cap 1 and the filler neck pipe 2.

The other end 31 of the engaging part 3 contacts the screw terminal end 24b of the second screw part 24 under a condition that the cylinder part 11 rotates around 45 degree, and if further rotating counterclockwise, the engaging part 3 is elastically deformed as the other end 31 approaches one end 30. Accordingly, the operator perceives the resistance and pulls the cap in the axial direction while rotating it counterclockwise. Since the horizontal distance (b) of the engaging part 3 is smaller than the horizontal distance (a) by the elastic deformation as shown in FIG. 8, the operator can pull the cap 1.

In the structure of the fuel pouring inlet of the present embodiment, since the engaging part 3 engages the notch when removing the cap 1, the cap cannot be removed by only rotating the cap 1. Thus, the cap 1 is exactly prevented from rapidly opening.

When removing the cap 1, until the engaging part 3 engages the notch and under the condition that the engaging part 3 engages the notch, the fuel steam slowly goes out in the atmospheric air from the space between the cap 1 and the opening part 20. Accordingly, the time that the steam slowly goes out in the atmospheric air is longer, and there is no disadvantage that the fuel steam is spouted at once.

In the present embodiment, the examples of the double screw thread are shown in the first screw part 12 and the second screw part 24 (simplified in FIGS. 7 and 8), and of course the same working and effect can be brought about in the single screw thread.

Figure 9:
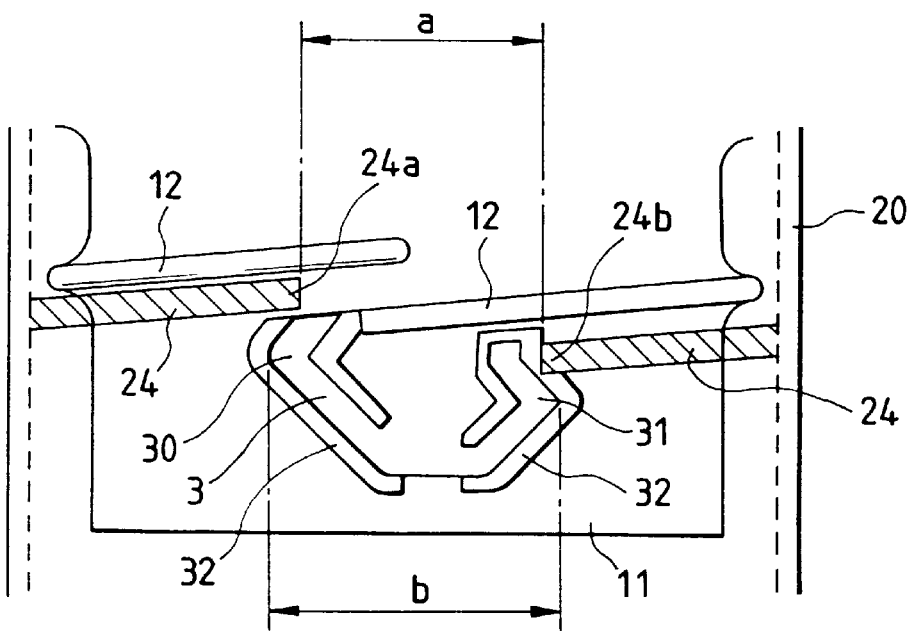
FIG. 9 shows an elementary cross sectional view of modification of the structure of the fuel pouring inlet according to the second embodiment of the invention.

FIG. 9 shows a modification of the second embodiment. In the structure of the fuel pouring inlet shown in FIG. 9, the end 30 and the other end 31 of the engaging part 3 are independent and composed elastically deformably.

In this structure, when the cap 1 is tightened, it is pressed by the screw starting end 24a of the first screw part 24 and the screw terminal end 24b, so that the engaging part 3 is elastically deformed in a direction that the end 30 and the other end 31 approach each other, and the engaging part 3 is pressed into the notch and the screwing starts.

When removing the cap 1, the other end 31 is pressed by the screw terminal end 24b and is elastically deformed, and if further pulling the cap 1, the engaging part 3 is elastically deformed in the direction that one end 30 and the other end 31 more approach, and the cap 1 can be pulled out at a time that the horizontal distance (b) of one end 30 and the other end 31 is smaller than the horizontal distance (a) of the notch. Since the number of steps for pulling the cap 1 is increased in comparison with the embodiment in FIGS. 6 to 8, the time that the fuel steam goes out into the atmospheric air is more lengthened, and there is no disadvantage that the fuel steam is spouted at once.

3rd Embodiment

Figure 10:
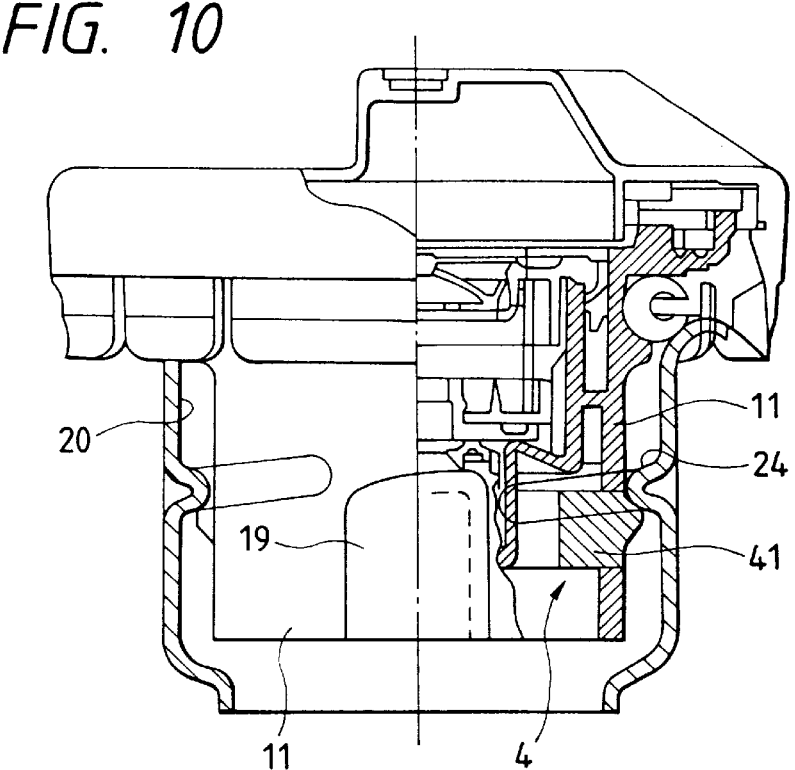
FIG. 10 shows an elementary cross sectional view showing working of the structure of the fuel pouring inlet according to a third embodiment of the invention.

FIG. 10 shows the structure of the fuel pouring inlet according to a third embodiment. This structure of the fuel pouring inlet is the same as the first embodiment excepting different structure to be described in the following.

Figure 11:
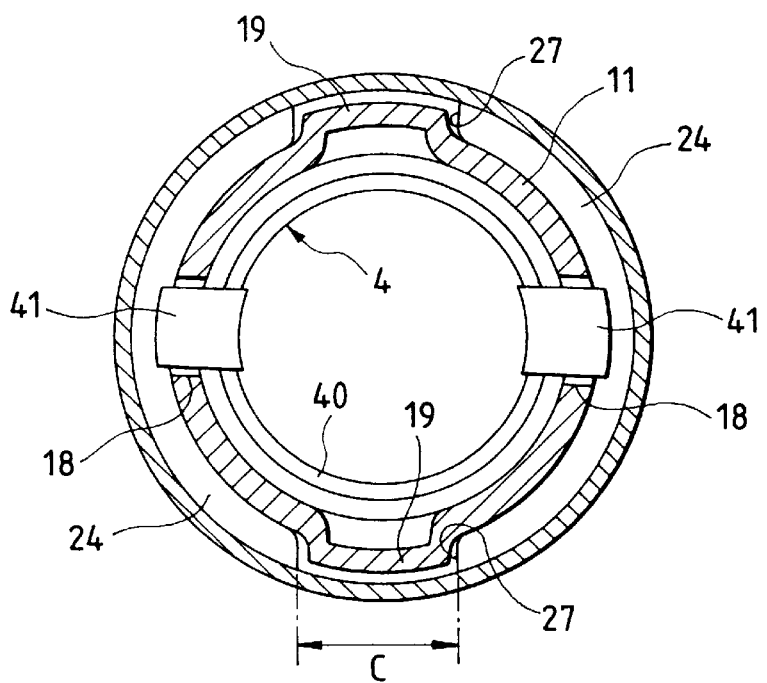
FIG. 11 shows a transverse sectional view of the structure of the fuel pouring inlet of FIG. 10.

In the inner periphery of the cylinder 11, an independent engaging ring 4 is coaxially disposed. The engaging ring 4, as shown in FIG. 11, comprises an elastically deformable ring shaped spring part 40 and a pair of convex parts 41 in opposition by 180 degree projecting in the outer circumferential direction. Front ends of the convex parts 41 are curved, projecting outward in the diameter direction from windows 18 formed in the cylinder part 11 and are engageable with the second screw part 24. When the spring part 40 is elastically deformed in a diameter shrinking direction, the convex parts 41 are set in the winders 18 so as not to interfere with the second screw part 24.

On the outer circumference of the cylinder part 11, a pair of positioning projections 19 are formed extending toward the front end of the cylinder part 11 at positions off by 90 degree from the windows 18, and are composed such that they engage the notches 27 of the horizontal distance (c) formed in the second screw part 24 of the double screw thread.

In the structure of the fuel pouring inlet of the present embodiment, when the cap 1 is tightened onto the filler neck pipe 2, the cylinder part 11 is at first inserted in the opening part 20, and the positioning projections 19 are engaged with the notches of the horizontal distance (c) formed in the second screw part 24. Thereby the positioning can be easily carried out.

Subsequently, the cap 1 is more pressed. Then, the convex part 41 contacting the second screw part 24 receives reaction of pressure from the second screw part 24 and is pressed inward in the diameter direction, and the spring part 40 is elastically deformed in the diameter shrinking direction, whereby the convex parts 41 are set in the windows 18. Thereby the cap 1 can be advanced further inside, and the convex parts 41 get over the second screw part 24.

Then, by the elastic force of the spring part 40, the convex parts 41 project in the diameter direction and engage the second screw part 24, and if rotating the cap 1, the convex parts 41 serve as the first screw part 12 and screw in mesh with the second screw part 24. Thereafter, rotating it 45 degree, the torque detecting mechanism is worked to accomplish the tightening.

When removing the cap 1 from the filler neck pipe 2, if the cap 1 is reversely rotated, the convex parts 41 serve as the first screw part 12, and the cap 1 goes back to the opening as engaging the second screw part 24. Then, the positioning projection 19 is restrained in rotation at the position that it contacts the end of the notch 27 of the second screw part 24. Therefore, even if the pressure of the fuel steam is high, the cap 1 is prevented from rapidly opening.

If the cap 1 is pulled against the biasing force from the spring part 40, the convex parts 41 are elastically deformed in the diameter shrinking direction of the spring part 40, so that they are set in the windows 18 and get over the second screw part 24 and the cap 1 can be taken off from the filler neck pipe.

Therefore, also in the present embodiment, the number of steps for pulling the cap 1 is more increased, and the time that the fuel steam goes out into the atmospheric air is more lengthened, and there is no disadvantage tat the fuel steam is spouted at once.

Figure 12B:
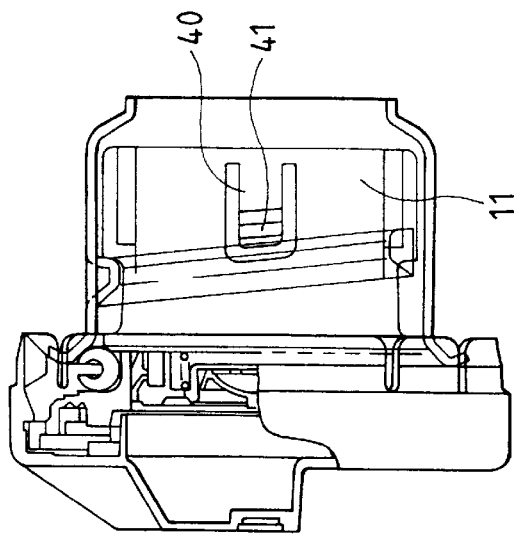
FIGS. 12(a)–12(c) show modification of the structure of the fuel pouring inlet according to the third embodiment of the invention.
Figure 12A:
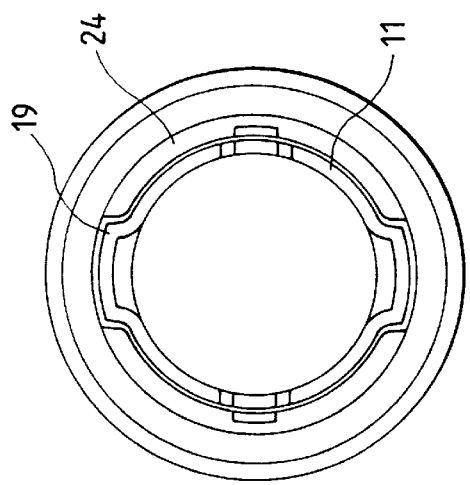
Figure 12C:
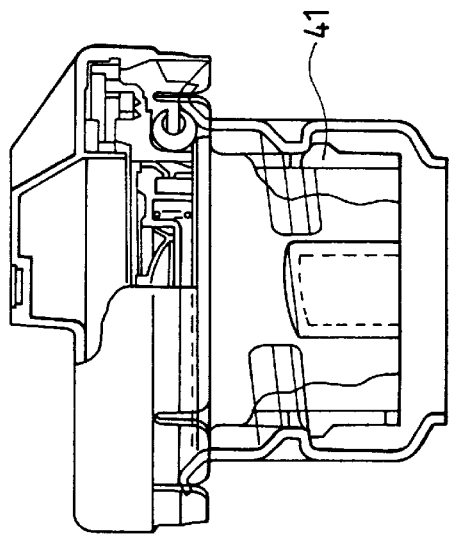

FIGS. 12(*a*)–12(*c*) show modification of the structure of the fuel pouring inlet according to the third embodiment of the invention.

In this modification, the spring part 40 and the convex parts 41 are integrally formed with the cylinder part 11. other specifications are same as the embodiment in FIGS. 10 and 11. In other words, the convex part41 are integrally formed with the cylinder part 11 through the spring part 40 as an elastic member.

That is to say, according to the inventive structure of the fuel pouring inlet, by preventing rapidly opening the cap, there is no disadvantage tat the fuel steam is spouted at once. The engaging distance between the first screw part and the second screw part can be shortened, the rotating operation of the cap is made very easy.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A structure of a fuel pouring inlet comprising:
    (A) a cap comprising:
       a cover part;
       a cylinder part extending from said cover part;
       a ring shaped sealing part furnished to a side of said cylinder part of said cover part; and
       a first screw part defined in an outer peripheral face of said cylinder part; and
    (B) a filler neck pipe comprising:
       an opening part; and
       a second screw part defined in an inner peripheral face of said opening part, said cap closing said opening part by engaging the first screw part and the second screw part;
    (C) a first engaging part elastically deforming in one of a circumferential direction and a diameter direction, said first engaging part being provided in one of the outer peripheral face of said cylinder part and the inner peripheral face of the opening part, the first engaging part being elastically deformed only at the time of insertion and removal of the cap in said opening part but not being deformed while the cap is rotated;
    (D) a second engaging part engageable with said first engaging part , said second engaging part being provided in the other of the outer peripheral face of said cylinder part and the inner peripheral surface of the opening part;
    wherein, when mounting said cap, said first engaging part is engaged with said second engaging part and is elastically deformed, and after releasing the engagement of said first engaging part and said second engaging part, said first screw part and the second screw part are screwed whereby said cap is fitted and secured on said filler neck pipe, and
    wherein, when removing said cap, said first engaging part is engaged with said second engaging part and is elastically deformed, and after releasing the engagement of said first engaging part and said second engaging part, the engagement between said cap and said filler neck pipe is released.

2. A structure of a fuel pouring inlet according to claim 1, wherein said first engaging part comprises an elastic arm part provided in the outer peripheral face of said cylinder part, and said second engaging part is a projection defined in the inner peripheral face of said opening part.

3. A structure of a fuel pouring inlet according to claim 1, wherein said first engaging part is substantially V-shaped, projecting from the outer peripheral face of said cylinder part and elastically deformable, following the outer peripheral face, in directions such that a first end of said first engaging part is near to and remote from a second end, and said second engaging part is a notch formed in said second screw part to allow said first engaging part to pass while being elastically deformed.

4. A structure of a fuel pouring inlet comprising:
    (A) a cap comprising:
       a cover part;
       a cylinder part extending from said cover part;
       a ring shaped sealing part furnished to a side of said cylinder part of said cover part; and
       a first screw part defined in an outer peripheral face of said cylinder part; and
    (B) a filler neck pipe comprising:
       an opening part; and
       a second screw part defined in an inner peripheral face of said opening part, said cap closing said opening part by engaging the first screw part and the second screw part;
    (C) a first engaging part elastically deforming in one of a circumferential direction and a diameter direction, said first engaging part being provided in one of the outer peripheral face of said cylinder part and the inner peripheral face of the opening part;
    (D) a second engaging part engageable with said first engaging part, said second engaging part being provided in the other of the outer peripheral face of said cylinder part and the inner peripheral surface of the opening part;
    wherein, when mounting said cap, said first engaging part is engaged with said second engaging part and is elastically deformed, and after releasing the engagement of said first engaging part and said second engaging part, said first screw part and the second screw part are screwed whereby said cap is fitted and secured on said filler neck pipe, wherein, when removing said cap, said first engaging part is engaged with said second engaging part and is elastically deformed, and after releasing the engagement of said first engaging part and said second engaging part, the engagement between said cap and said filler neck pipe is released, and wherein said first engaging part comprises a convex part elastically deformable as rising and setting in a diameter direction from said outer peripheral face of said cylinder part, and said second engaging part comprises said second screw in itself, and said convex part passes said second screw part under a condition that it is set from said cylinder part, and when said convex part projects from said cylinder part, said convex part serves as said first screw part which is engageable with said second screw part.

5. A structure of a fuel pouring inlet according to claim 4, wherein said convex part is integrally formed with said cylinder part through an elastic member.

6. A structure of a fuel pouring inlet according to claim 4, wherein said convex part is formed on an elastically deformable ring member which is disposed in an inner periphery of said cylinder part so as to project said convex part through a window provided in said cylinder part.

* * * * *